US011808166B1

(12) United States Patent
Brown

(10) Patent No.: US 11,808,166 B1
(45) Date of Patent: Nov. 7, 2023

(54) ADDITIVELY MANUFACTURED BLADED-DISK HAVING BLADES WITH INTEGRAL TUNED MASS ABSORBERS

(71) Applicant: United States of America as represented by the Administrator of NASA, Washington, DC (US)

(72) Inventor: Andrew Michael Brown, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/406,736

(22) Filed: Aug. 19, 2021

(51) Int. Cl.
*F01D 5/16* (2006.01)
*F01D 5/18* (2006.01)
*B33Y 80/00* (2015.01)

(52) U.S. Cl.
CPC ............. *F01D 5/16* (2013.01); *F01D 5/18* (2013.01); *B33Y 80/00* (2014.12); *F05D 2230/31* (2013.01); *F05D 2240/307* (2013.01); *F05D 2250/14* (2013.01); *F05D 2250/62* (2013.01); *F05D 2260/96* (2013.01)

(58) Field of Classification Search
CPC ..... F01D 5/16; F01D 5/26; F01D 5/18; F01D 25/06; F01D 5/10; F01D 5/181; Y10S 416/50; F04D 29/668; F04D 29/324; F04D 29/388; F04D 29/661; B33Y 80/00; F05D 2230/31; F05D 2240/307; F05D 2250/14; F05D 2250/62; F05D 2260/96; F16F 15/10
See application file for complete search history.

(56) References Cited

U.S. PATENT DOCUMENTS

| 1,833,751 | A | * | 11/1931 | Kimball | .................... | F01D 5/16 |
| | | | | | | 416/232 |
| 2,689,107 | A | * | 9/1954 | Odegaard | ................. | F01D 5/16 |
| | | | | | | 416/500 |
| 5,373,922 | A | | 12/1994 | Marra | | |
| 6,874,992 | B2 | * | 4/2005 | Dailey | .................... | F01D 5/187 |
| | | | | | | 416/97 R |
| 7,217,093 | B2 | * | 5/2007 | Propheter | ................. | F01D 5/16 |
| | | | | | | 416/500 |
| 7,431,564 | B2 | | 10/2008 | Newman | | |
| 8,915,718 | B2 | * | 12/2014 | Dolansky | .................. | F01D 5/16 |
| | | | | | | 416/232 |
| 9,121,288 | B2 | | 9/2015 | Campbell et al. | | |
| 9,133,713 | B2 | | 9/2015 | Allen-Bradley | | |
| 10,697,303 | B2 | | 6/2020 | Blaney et al. | | |

(Continued)

*Primary Examiner* — Eric J Zamora Alvarez
(74) *Attorney, Agent, or Firm* — Jerry L. Seemann; Trenton J. Roche

(57) ABSTRACT

Embodiments of an additively fabricated turbine blade having an integral tuned mass absorber are disclosed herein. The tuned mass absorber has an elliptical cross-section that results in the suppression of blade vibrations in at least two orthogonal modes of vibration. The tuned mass absorber is formed simultaneously during the additive fabrication of the blade. In an embodiment, the tuned mass absorber extends spanwise. In another embodiment, the tuned mass absorber extends chordwise. The dynamic responses of these spanwise and chordwise tuned mass absorbers are analytically predictable such that the dynamic responses may be incorporated into the design process of the turbine blade.

21 Claims, 14 Drawing Sheets

(56) References Cited

U.S. PATENT DOCUMENTS

| | | |
|---|---|---|
| 10,914,320 B2 | 2/2021 | Twelves, Jr. et al. |
| 11,371,358 B2 * | 6/2022 | Chakrabarti ............... F01D 5/16 |
| 2017/0368608 A1 | 12/2017 | Homma et al. |

* cited by examiner

ADDITIVELY MANUFACTURED BLADED-DISK HAVING BLADES WITH INTEGRAL TUNED MASS ABSORBERS

ORIGIN OF THE INVENTION

The invention described herein was made by an employee of the United States Government and may be manufactured and used by or for the Government of the United States of America for governmental purposes without the payment of any royalties thereon or therefor.

CROSS-REFERENCES TO RELATED PATENT APPLICATIONS

None.

TECHNICAL FIELD

The present invention relates to an additively manufactured bladed-disk having blades with integral tuned mass absorbers.

BACKGROUND

Turbomachinery is used in many industries such as aerospace, rocketry, jet engines and power generation. Such turbomachinery includes one or more turbines. A turbine generally comprises a rotor disk and a plurality of separate turbine blades that are joined or attached to the rotor disk by any one of a variety of techniques. The standard method of attachment is to slide the blades into slots in the turbine and lock them into place mechanically. This combination of the rotor disk and separate turbine blades is known as an "inserted-bladed-disk". A portion of a typical conventional inserted-bladed-disk is shown in FIG. 1. Although the turbines may be used in different industries, the turbine blades are similar in appearance and exhibit substantially the same types of problems and deficiencies. High-cycle fatigue from resonant response is one of the most significant problems experienced by such turbine blades. Resonance occurs briefly during the ramp up to or ramp down from operating speed when the engine rotation provides a harmonic excitation close to a natural frequency and at a longer duration if the engine's cruise operating speed itself is close to a natural frequency. Cracking and failure of turbine blades due to operation at modal resonance costs the turbine industry hundreds of millions of dollars every year either due to failure or costly preventive strategies. One attempt to address the problem entailed adding separate small block-like parts to the inserted bladed-disk. FIG. 1 illustrates an inserted bladed-disk having this configuration. In order to simplify this drawing, only a portion of the inserted bladed-disk is shown. Each turbine blade 1 has root portion 2 and platform 3 that is attached to or integral with root portion 2. Root portion 2 is joined or attached to rotor disk 4. Block-like components 5 are positioned between platforms 3 of adjacent of the turbine blades 1 that rub together during high resonant response. Block-like components 5 function as dampers and provide frictional damping so as to reduce the resonant response. However, this approach introduces new problems related to potential foreign object debris and damper lock-up.

Recent trends in the turbine industry have shown a preference for monolithic "integrally bladed-disks" (also known as "blisks") over the separate inserted-bladed-disks. In a blisk, the blades and disk are fabricated from a single piece of metal. Integrally bladed-disks reduce part count by an order of magnitude thereby reducing manufacturing and tracking costs. However, a significant shortcoming of the conventional monolithic blisks is the unintended elimination of damping at the blade/disk interface which results in exacerbation of vibration issues. Conventional techniques discussed above, such as the placement of block-like components (i.e. dampers) can only be implemented in blisks designs with difficulty because the entire blisk is monolithic and the blades have no platforms. Some conventional designs do have ring or other dampers etched into depressions near the blade roots, but these locations undergo very little vibration so the dampers themselves also have very little motion rendering them ineffective. There have been other attempts to resolve the elimination of damping in the monolithic blisk. Such other attempts depended upon one or more factors such as impact, friction, or highly uncertain viscoelastic and elastomeric material properties to reduce the dynamic response. However, impact, friction, viscoelastic and elastomeric material properties are essentially analytically-intractable factors and conditions and therefore impossible to predict during design of the blisks. Furthermore, the damping characteristics for viscoelastic or elastomeric material are not only difficult to predict but frequently cannot withstand the extreme environments of many turbomachinery environments. Consequently, it is necessary to implement expensive, post-design test programs on the entire monolithic blisk in order to determine if the blade damper will actually reduce the dynamic response. Other conventional approaches to resolve the lack of damping in the conventional monolithic blisks require tedious and complex welding of external objects onto the blades. However, these external objects typically mitigate dynamic response of only a single mode of vibration. Another conventional approach requires fabricating a long, thin beam and then inserting the long, thin beam radially into the blade. A complex mechanical attachment operation is required to keep the long, thin beam in place. The long, thin beam is then optimized to suppress the vibration of a single mode of interest. Another conventional approach entailed welding an internal damper to the interior of a removable blade-tip cap. However, this technique is likely to very expensive to implement. Significant drawbacks and deficiencies of this conventional approach are the prohibitively high cost of manually fabricating the long, thin beam and the attachment structure for each blisk turbine blade, which can number over a hundred per blisk, and the limitation of suppressing vibrations in only a single mode. Other conventional techniques require un-validated advanced nonlinear analysis techniques in order to predict the response.

Clearly, an improved technique for reducing the resonant response of the blade component of a blisk is needed.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of an additively manufactured blisk having blades with integral tuned mass absorbers are disclosed herein. Each blade has a single tuned mass absorber which has an elliptical cross-section. The elliptical cross-section provides three absorber parameters, the major axis, the minor axis and the length, which initially are optimized to match the natural frequencies of any two blade modes of which the vibratory responses are to be reduced. The mass of the absorber is as large as possible while maintaining adequate blade radial strength of the cavity cross-section. The geometric size of the cavity will constrain the mass magnitude. The tuned mass absorber is additively fabricated during the additive fabrication of the blade without the need for any additional components. The elliptical cross-section of the tuned mass absorber facilitates suppression of blade vibrations in two orthogonal modes of vibration thereby reducing the resonance response. For example, the elliptical cross-section of the single, integral tuned mass absorber reduces resonance response in both the flexwise and stiffwise modes. In an embodiment, the tuned mass absorber extends along the spanwise axis of the blade. In another embodiment, the tuned mass absorber extends chordwise between the leading and trailing edges of the blade, wherein the tuned mass absorber has a curvature that corresponds to the chord of the blade. The dynamic responses of these integral spanwise and chordwise tuned mass absorbers are analytically predictable such that the dynamic responses may be incorporated into the design process of the blade.

In some embodiments disclosed herein, a monolithic blisk fabricated by an additive fabrication process comprises a disk portion having a periphery and a plurality of blades radially extending from the periphery and consecutively arranged in an annular array. Each blade has a blade tip, a leading edge, a trailing edge, a pressure side and a suction side and is configured with an internal cavity having a cavity inner wall. The internal cavity is located between the pressure side and suction side. Each blade is further configured to have a tuned mass absorber located within the internal cavity. The tuned mass absorber is additively fabricated during the additive fabrication of the blisk. The tuned mass absorber has a first end portion that is integral with the cavity inner wall and a free opposite second end portion. The tuned mass absorber has an elliptical cross-section that facilitates suppression of blade vibrations in at least two modes of vibration.

In some embodiments, a monolithic blisk fabricated by an additive fabrication process comprises a disk portion having a periphery and a plurality of blades radially extending from the periphery and consecutively arranged in an annular array. Each blade has a blade tip, a leading edge, a trailing edge, a pressure side and a suction side and is configured with an internal cavity having a cavity inner wall. The internal cavity is located between the pressure side and suction side. Each blade is further configured to have a tuned mass absorber located within the internal cavity. The tuned mass absorber is additively fabricated during the additive fabrication of the blisk. The tuned mass absorber has a longitudinally extending axis, a first end that is integral with the cavity inner wall and a free opposite second end portion. The internal cavity and the tuned mass absorber extend in a spanwise direction. The free opposite second end portion of the tuned mass absorber is located radially inboard of the first end portion of the tuned mass absorber. The tuned mass absorber has an elliptical cross-section that facilitates suppression of blade vibrations in at least two modes of vibration.

In some embodiments, a monolithic blisk is fabricated by an additive fabrication process and comprises a disk portion having a periphery and a plurality of blades radially extending from the periphery and consecutively arranged in an annular array. Each blade has a blade tip, a leading edge, a trailing edge, a pressure side and a suction side and is configured with an internal cavity having a cavity inner wall. The internal cavity is located between the pressure side and suction side. Each blade is further configured to have a tuned mass absorber located within the internal cavity. The tuned mass absorber is additively fabricated during the additive fabrication of the blisk. The internal cavity and the tuned mass absorber extend chordwise between the leading edge and the trailing edge. The internal cavity and the tuned mass absorber are configured to have a curvature that corresponds to the chord of the blade. The tuned mass absorber comprises a first end portion that is integral with the cavity inner wall and a free opposite second end portion. The tuned mass absorber has an elliptical cross-section that facilitates suppression of blade vibrations in at least two modes of vibration. The cavity inner wall has smooth filleted areas and the first end portion of the tuned mass absorber is configured with a smooth filleted area, having the largest possible radius, which merges with the smooth filleted areas of the cavity inner wall so as to reduce vibratory stress concentration on the tuned mass absorber.

In some embodiments, a turbine blade formed from an additive fabrication process, comprises a blade tip, a leading edge, a trailing edge, a pressure side and a suction side and is configured with an internal cavity having a cavity inner wall. The internal cavity is located between the pressure side and suction side. The blade is further configured to have a tuned mass absorber located within the internal cavity. The tuned mass absorber is additively fabricated during the additive fabrication of the turbine blade. The tuned mass absorber has a first end that is integral with the cavity inner wall and a free opposite second end portion. The tuned mass absorber has an elliptical cross-section that facilitates suppression of blade vibrations in at least two modes of vibration. In an embodiment, the internal cavity and tuned mass absorber extend in a spanwise direction wherein the tuned mass absorber is oriented such that the free opposite second end portion is located radially inboard of the first end portion. In another embodiment, the internal cavity and tuned mass absorber extend chordwise between the leading edge and the trailing edge.

DETAILED DESCRIPTION

Figure 1:
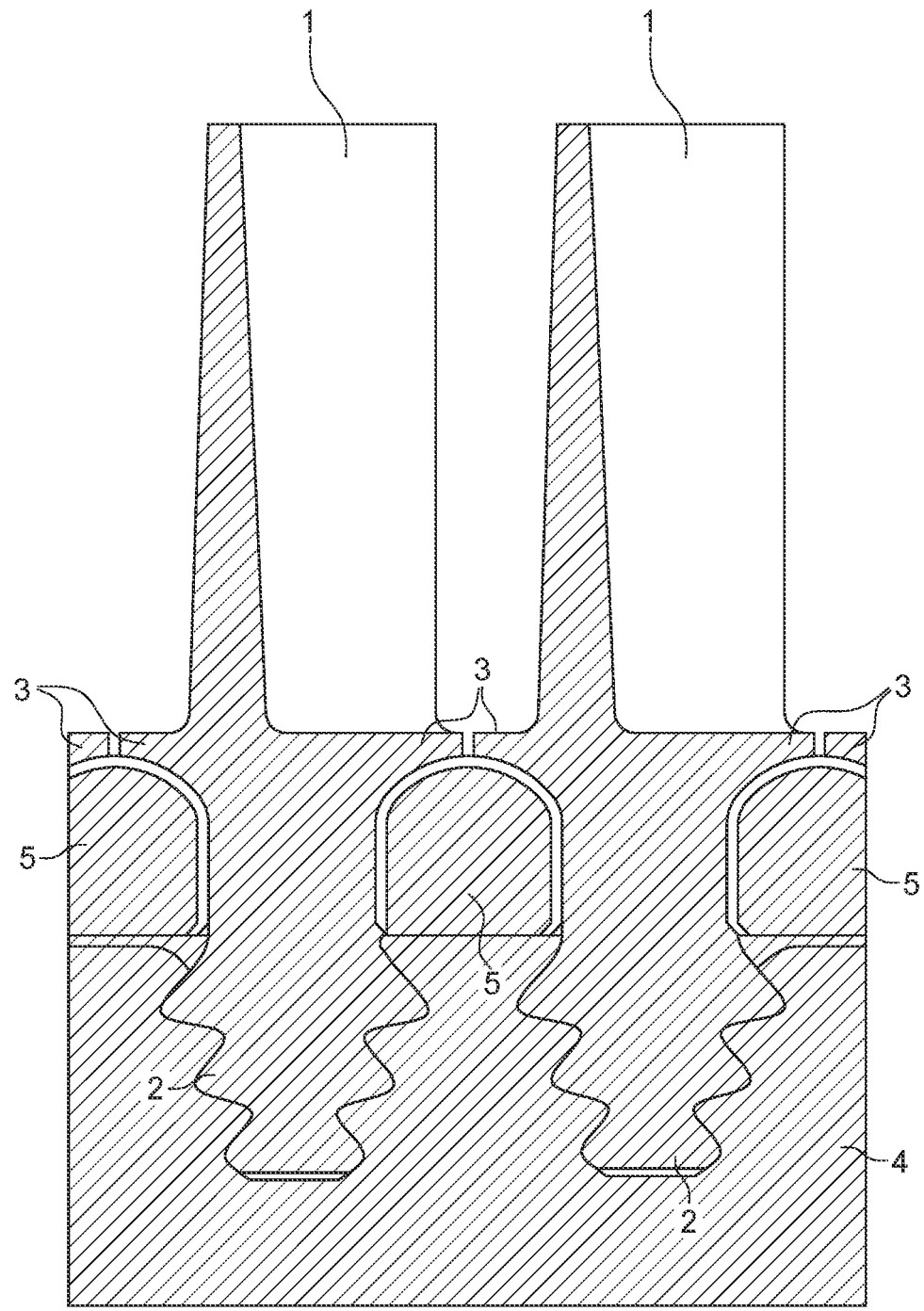
FIG. 1 is an illustration of a portion of a conventional inserted bladed-disk with block dampers positioned between the platforms of adjacent blades for reducing the response at modal resonance.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, terms such as "vertical", "horizontal", "top", "bottom", "upper", "lower", "middle", "above", "below" and the like are used for convenience in identifying relative locations of various components and surfaces relative to one another in reference to the drawings and these terms are not intended to be limiting in any way.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "embodiment" in various places in the specification are not necessarily all referring to the same embodiment.

As used herein, the term "absorber" refers to a "tuned mass absorber" (a.k.a. "TMA").

As used herein, "additive manufacturing process" or "additive fabrication" includes, but is not limited to, Laser Metal Sintering (LMS), Sterolithography Laser Sintering (SLS), Directive Selective Laser Sintering (DSLS), Direct Metal Laser Sintering (DMLS), Electronic Beam Sintering (EBS), Electron Beam Melting (EBM), Laser Engineered Net Shaping (LENS), Laser Net Shape Manufacturing (LNSM) and Direct Metal Deposition (DMD).

Embodiments of an additively fabricated blisk are disclosed herein. The blisk comprises a disk portion having a periphery and a plurality of blades radially extending from the periphery and consecutively arranged in an annular array. Each blade includes at least one integral tuned mass absorber that is formed as the blade is being additively fabricated. In an exemplary embodiment, the additive fabrication or manufacturing process is a laser metal sintering (LMS) process. The additive fabrication process sequentially builds up layers of alloy and/or ceramic powder material such as, but not limited to, alloys, stainless steel, tool steel, cobalt chrome, titanium, nickel, aluminum and others in powder or wire material form. Alloys, such as Alloys 625, 718 and 230, may be used for parts that operate in the high temperature environments to which aerospace and gas turbine engine components are subjected. The additive fabrication process enables cost-effective formation of the absorber completely internal to the blade thereby allowing fabrication of complex cross-sections and eliminating expensive welding, machining or other traditional fabrication procedures.

Figure 2A:
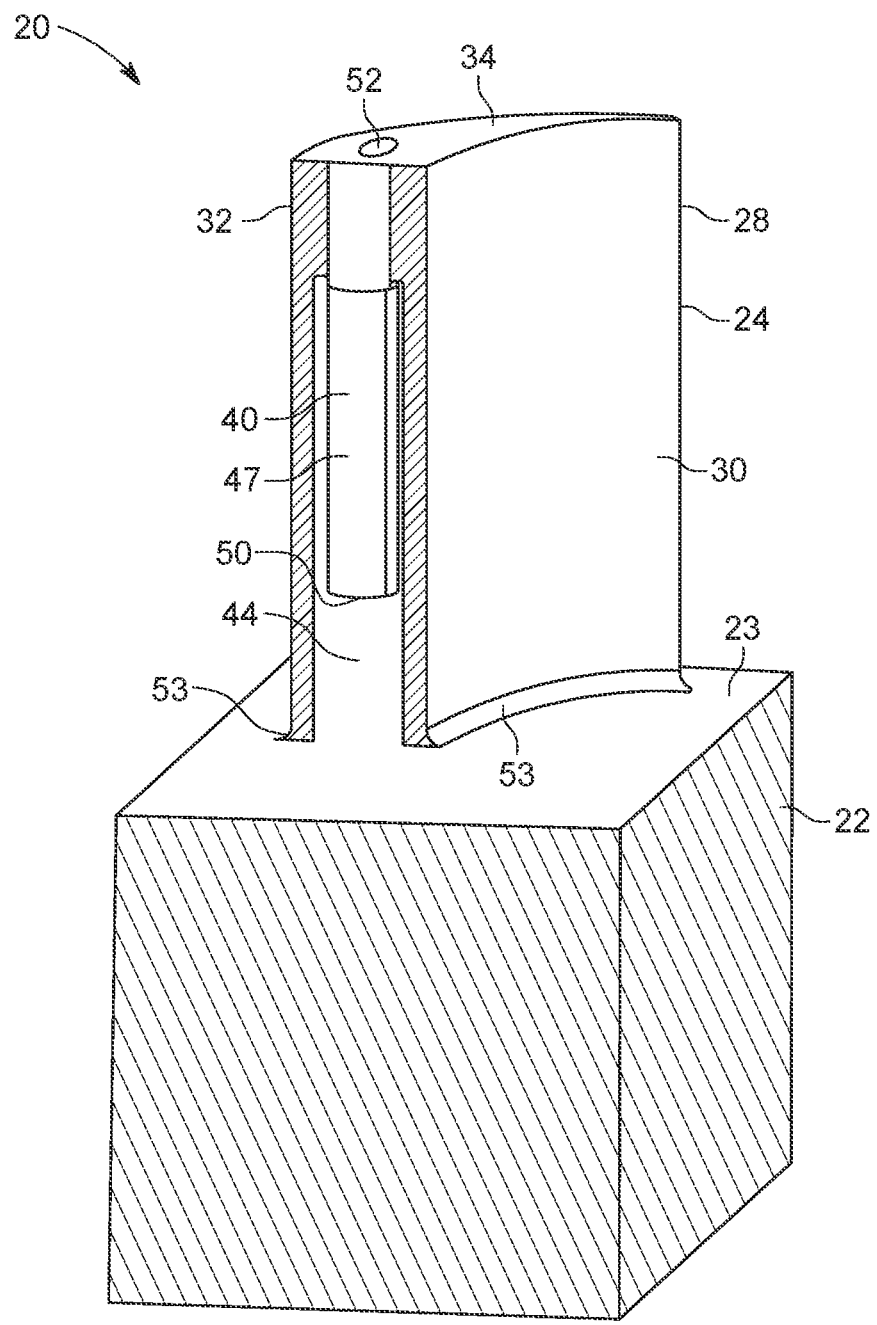
FIG. 2A is a perspective view, in cross-section, of a portion of an additively manufactured blisk having a blade in accordance with an exemplary embodiment, wherein the blade has an integral tuned mass absorber extending in a spanwise direction.
Figure 2B:
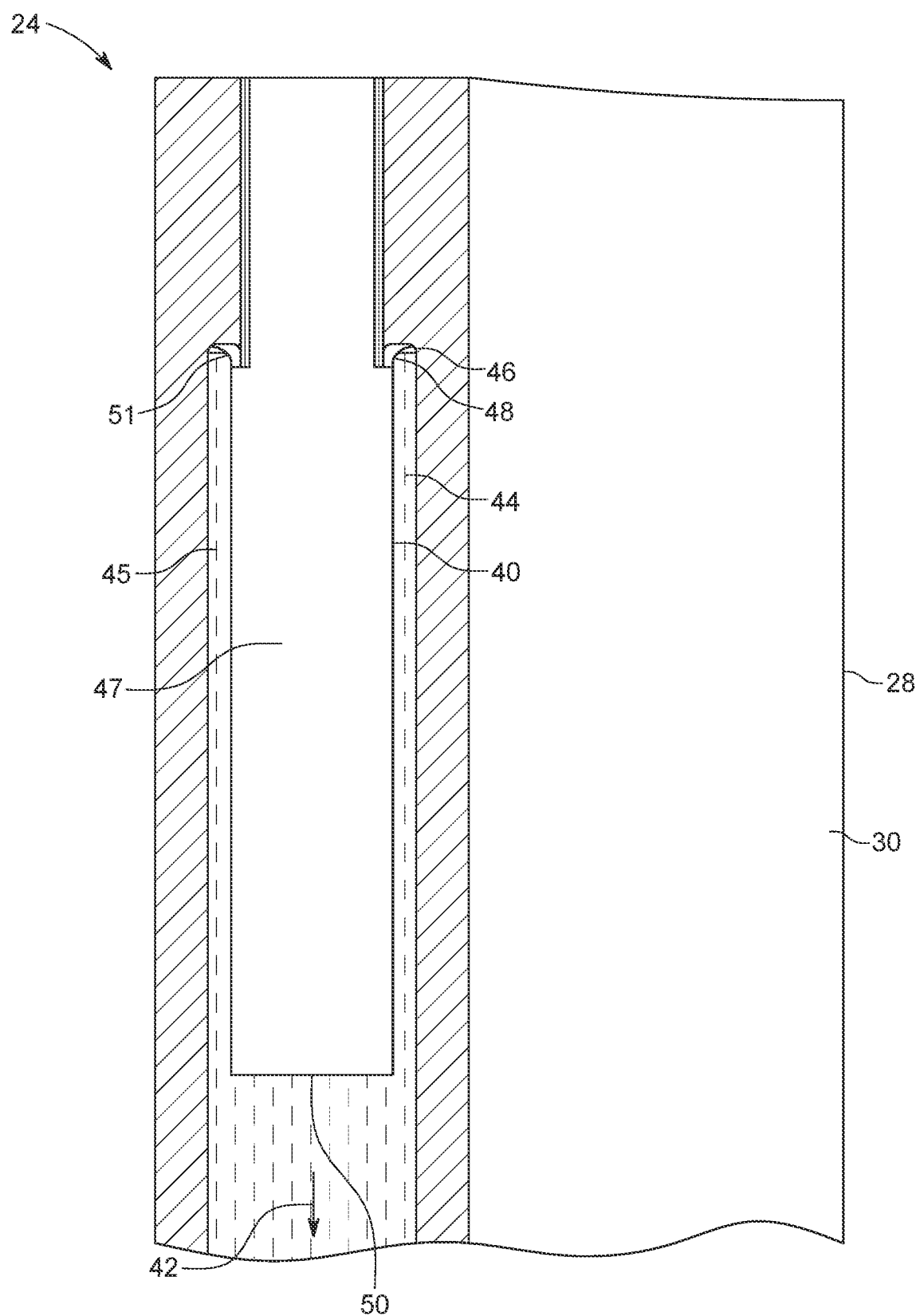
FIG. 2B is an enlarged portion of the view shown in FIG. 2A.
Figure 2C:
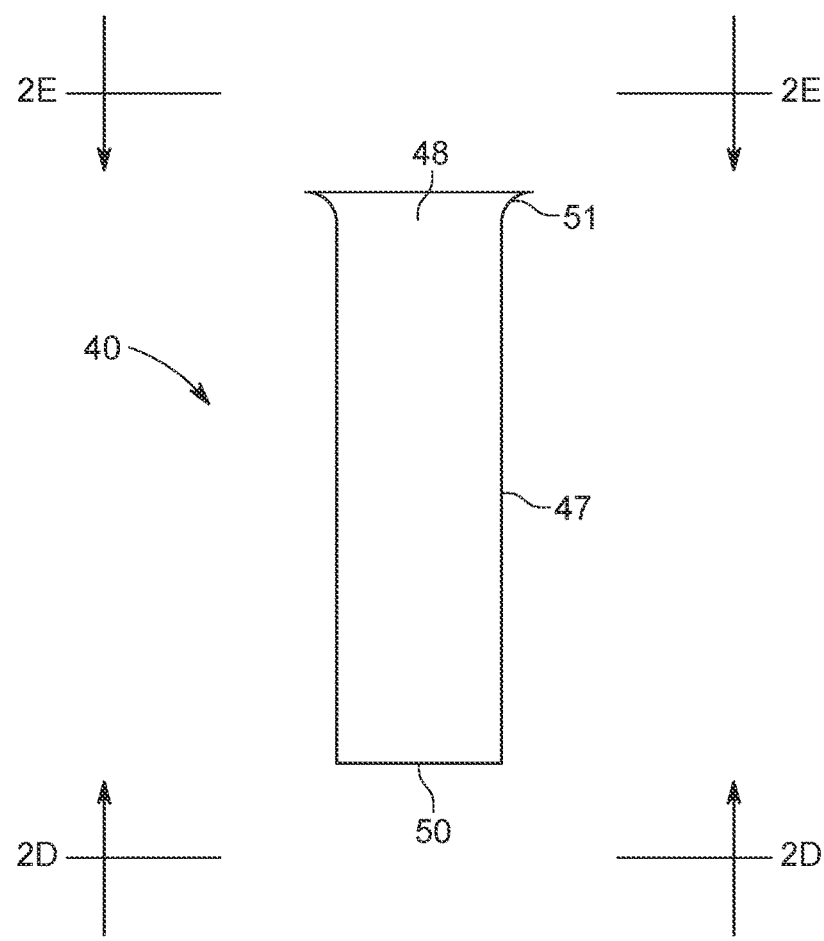
FIG. 2C is an elevational view of the integral tuned mass absorber shown in FIGS. 2A and 2B.
Figure 2D:
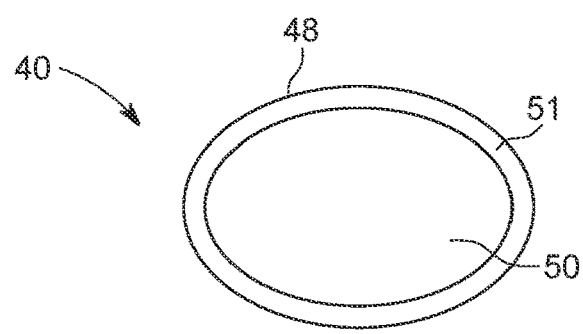
FIG. 2D is an end view taken along line 2D-2D of FIG. 2C.
Figure 2E:
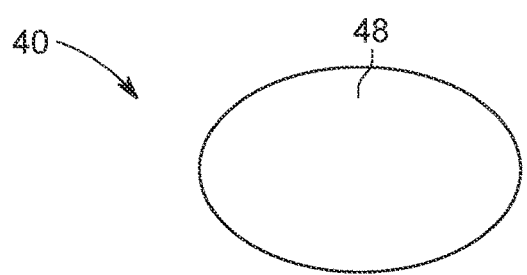
FIG. 2E is another end view taken along line 2E-2E of FIG. 2C.
Figure 2F:
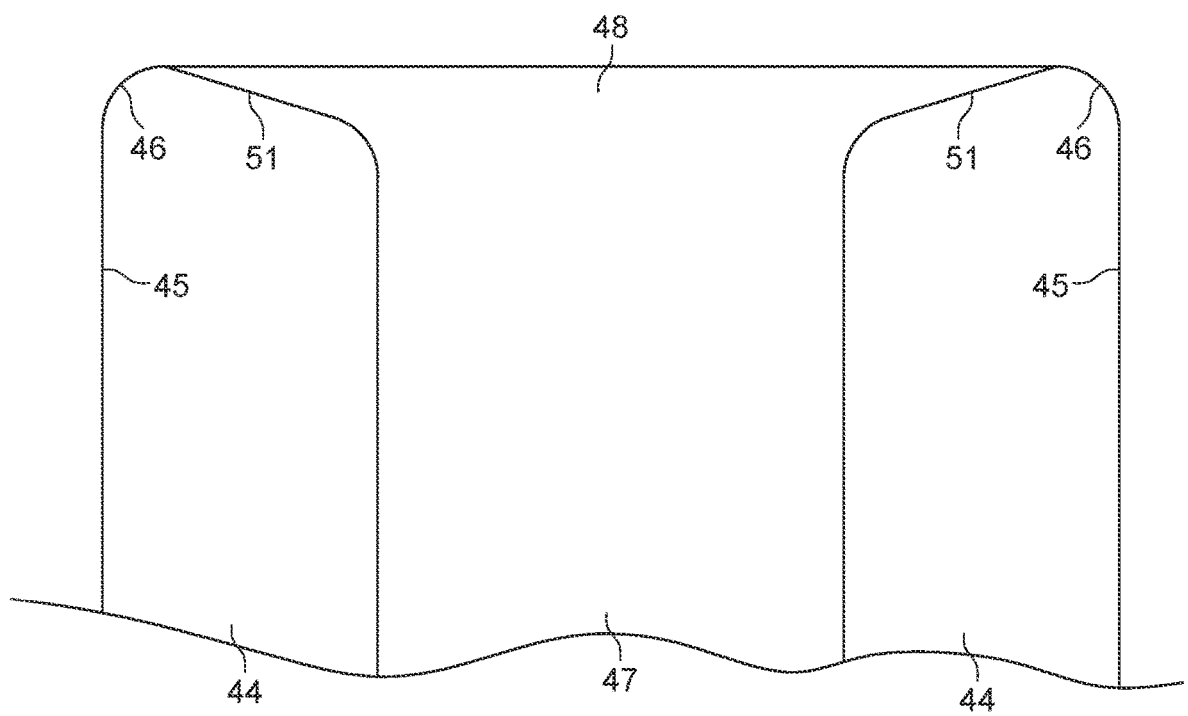
FIG. 2F is a diagram illustrating the integration of the filleted area of the tuned mass absorber with the filleted areas of the cavity inner wall.
Figure 2G:
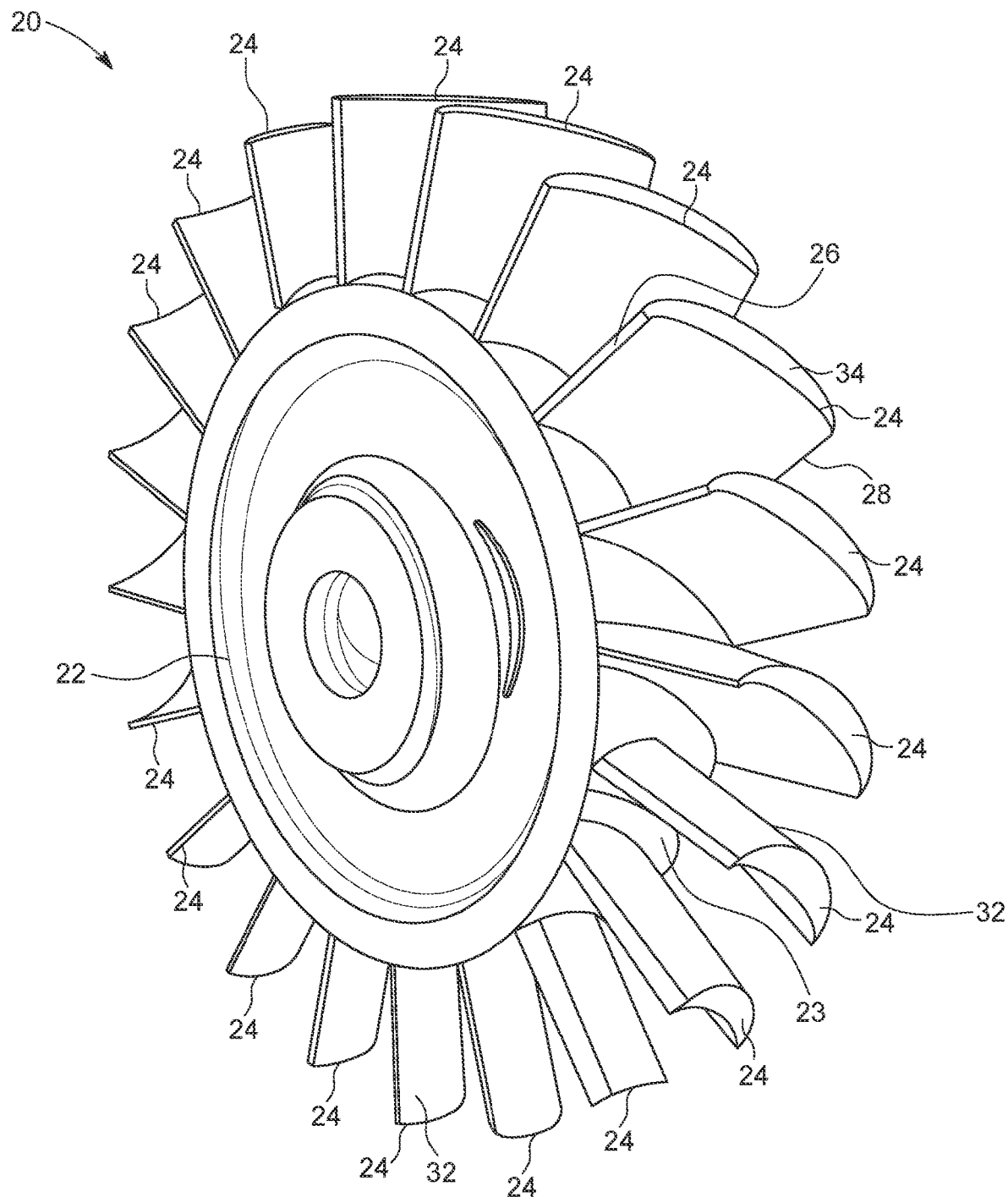
FIG. 2G is a perspective view of the entire monolithic additively fabricated blisk of FIG. 2A.

Referring to FIGS. 2A-2G, there is shown a perspective view, in cross-section, of a portion of additively fabricated blisk 20. Blisk 20 comprises disk portion 22 having periphery 23 and a plurality of blades 24 radially extending from the periphery and consecutively arranged in an annular array. FIG. 2A is a partial view of blisk 20 and therefore, only one blade 24 is shown. Blade 24 includes leading edge 26 and trailing edge 28. The chord of blade 24 is defined between leading edge 26 and trailing edge 28. Concave pressure side 30 and convex suction side 32 are also defined between the leading edge 26 and trailing edge 28. Blade 24 includes tip portion 34. Blade 24 further includes integral tuned mass absorber 40 that is additively fabricated simultaneously with the additive fabrication of blade 24. Absorber 40 is oriented along spanwise axis 42 of blade 24 (see FIG. 2B). Absorber 40 is located within internal cavity 44 that is created during the additive fabrication process. Internal cavity 44 has cavity inner wall 45 which has filleted or curved areas 46. The purpose of the filleted or curved areas 46 is to eliminate any sharp angles in cavity inner wall 45. As shown in FIG. 2B, absorber 40 is additively fabricated to have elongate portion 47, first end portion 48 and a free opposite second end portion 50. The first end portion 48 (i.e. the fixed end) is located at the most highly responsive spanwise location of blade 24 under typical loading thereby enabling a high-level of base excitation and exercise of absorber 40. Absorber 40 has an elliptical cross-section. It has been found that the elliptical cross-section facilitates suppression of blade vibrations in at least two modes of vibration. In this embodiment, absorber 40 significantly reduces vibratory response in both the flexwise and stiffwise/torsion modes. Specifically, the elliptical cross-section provides three absorber parameters: the major axis, the minor axis and the length. These three absorber parameters initially are optimized to match the natural frequencies of any two blade modes of which the vibratory responses are to be reduced. The mass of absorber 40 is as large as possible while maintaining adequate blade radial strength of the cavity cross-section. The geometric size of the cavity will constrain the mass magnitude. The geometric shape of absorber 40 and internal cavity 44 are the results of an optimization process that is described in the ensuing description. As shown in FIGS. 2B, 2C, 2D and 2E, first end portion 48 is configured to have filleted areas 51 in order to eliminate any sharp angles. First end portion 48 is completely integral with cavity inner wall 45. As shown in FIG. 2B, filleted areas 51 of first end portion 48 are contiguous with the filleted or curved areas 46 of cavity inner wall 45 thereby eliminating any sharp angles and providing a smooth transition from cavity inner wall 45 to elongate section 47 of absorber 40. Thus, cavity inner walls 45 merge with absorber 40 at the start of filleted areas 51 of first end portion 48. As a result of this configuration, filleted areas 46 and 51 significantly reduce vibratory stress concentrations on absorber 40. In an exemplary embodiment, smooth filleted areas 51 have the largest possible radii. Opposite second end portion 50 of absorber 40 is free and located radially inboard of first end portion 48. As absorber 40 absorbs vibrations during operation of blisk 20, elongate portion 47 and opposite second end portion 50 of absorber 40 do not contact cavity inner wall 45. As shown in FIG. 2A, blade 24 includes opening 52 in blade tip 34. Opening 52 is formed during the additive fabrication process. The purpose of opening 52 is described in the foregoing description. As shown in FIG. 2A, blade 24 has filleted areas 53 so as to smoothly merge with periphery 23 of disk portion 22.

Optimization of absorber 40 is accomplished with advanced engineering simulation software that provides the required forced-response analysis. One suitable commercially available simulation software is the ANSYS Workbench© software suite. The optimization process uses an initial set of geometrical parameters of absorber 40 including the length and the elliptical cross-section parameters such as the major axis and the minor axis. The length of absorber 40 is also subject to the maximum possible size of internal cavity 44. The initial geometrical parameter settings are developed by analytically isolating absorber 40 and then optimizing so that the two fundamental modes of vibration for absorber 40 equal the two problematic modes of vibration for blade 24 modeled with internal cavity 44 but without absorber 40. However, this is not the final optimized solution because a forcing function will favor one mode over another mode. Therefore, a common generic loading function is applied, which in the general case is a unit pressure load on concave pressure side 30 of blade 24, and the displacement of a selected single location on blade tip 34 is measured in order to determine the vibratory response. Optimization is then performed on the complete blade 24 having internal integral absorber 40 which results in the final geometrical parameter values. After the final geometrical parameter values are obtained, the CAD (Computer-Aided-Design) files are then generated and loaded into the computer controlled additive fabrication machine.

For purposes of understanding the additive fabrication of blades 24 with internal absorbers 40, the following description is in terms of the additive fabrication of a single blade 24. However, it is to be understood that the entire blisk 20 is fabricated in a single additive fabrication procedure. In an embodiment, a first step in additively fabricating blade 24 is to determine the final geometrical parameter values of absorber 40 using the aforesaid optimization process. Next, a CAD (computer aided drawings) data file is generated which includes the determined final geometrical parameter values of absorber 40. The CAD data file is programmed or loaded into the computer or microprocessor of an additive manufacturing machine (e.g. Laser Metal Sintering machine). The additive fabrication process of blisk 20 is then initiated. The metal powder is disposed in layers either from leading edge 26 to trailing edge 28 or from trailing edge 28 to leading edge 26. A blade support lattice is fabricated to support the blade during the additive fabrication process. During the additive fabrication process, internal cavity 44 and absorber 40 are formed in spanwise direction 42. Because absorber 40 extends in the spanwise direction 42 and would be suspended during the additive fabrication process, a temporary absorber support lattice is formed within internal cavity 44 during the additive fabrication process in order to support the layers of metal powder that will eventually form absorber 40. After the additive fabrication process is complete, the next step is to grind off sections of the blade support lattice that are greater than 45 degrees from vertical. Hand tools may be used for this step. Next, residue metal powder contained within internal cavity 44 is blown through hole 52 in blade tip 34. Next, the temporary absorber support lattice within internal cavity 44 is also removed. In one embodiment, the temporary absorber support lattice is removed with an electro-discharge manufacturing (EDM) tool such as an EDM probe. This step may include the step of fabricating the EDM probe. The EDM probe is configured to have a cross-section that is equal to the absorber support lattice. The EDM probe is inserted into hole 52 in blade tip 34 and then lowered into internal cavity 44 in order to melt away the temporary absorber support lattice. Other suitable techniques may be used as well in order to melt or dissolve the temporary absorber support lattice. Next, the exterior surface of blade 24 is then finished using standard additive manufacturing techniques such as the "Low Stress Ground" method.

Figure 3A:
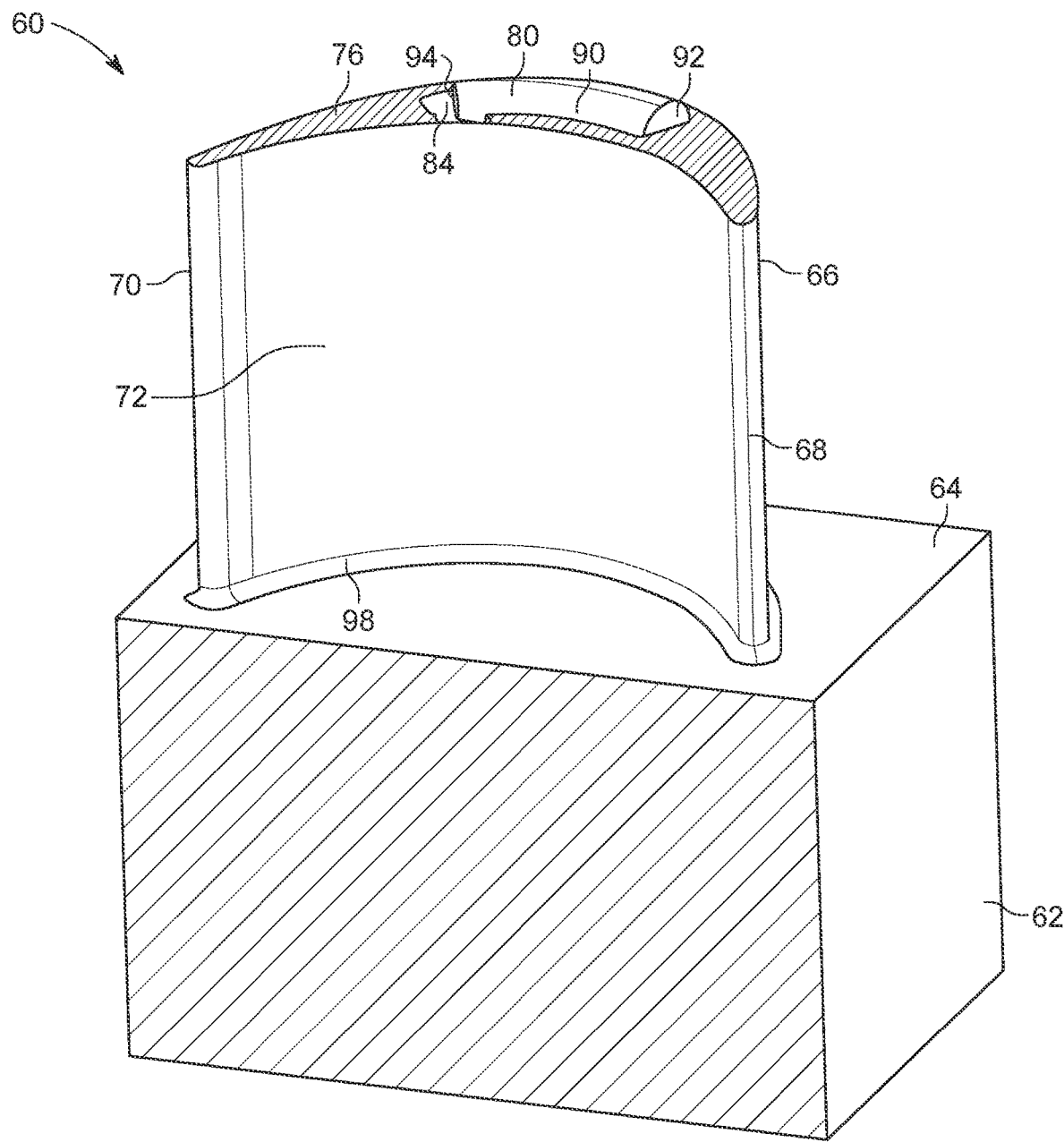
FIG. 3A is a perspective view, in cross-section, of a portion of an additively manufactured blisk having a blade in accordance with another exemplary embodiment, wherein the blade has an integral tuned mass absorber extending chordwise between the leading and trailing edges of the blade.
Figure 3B:
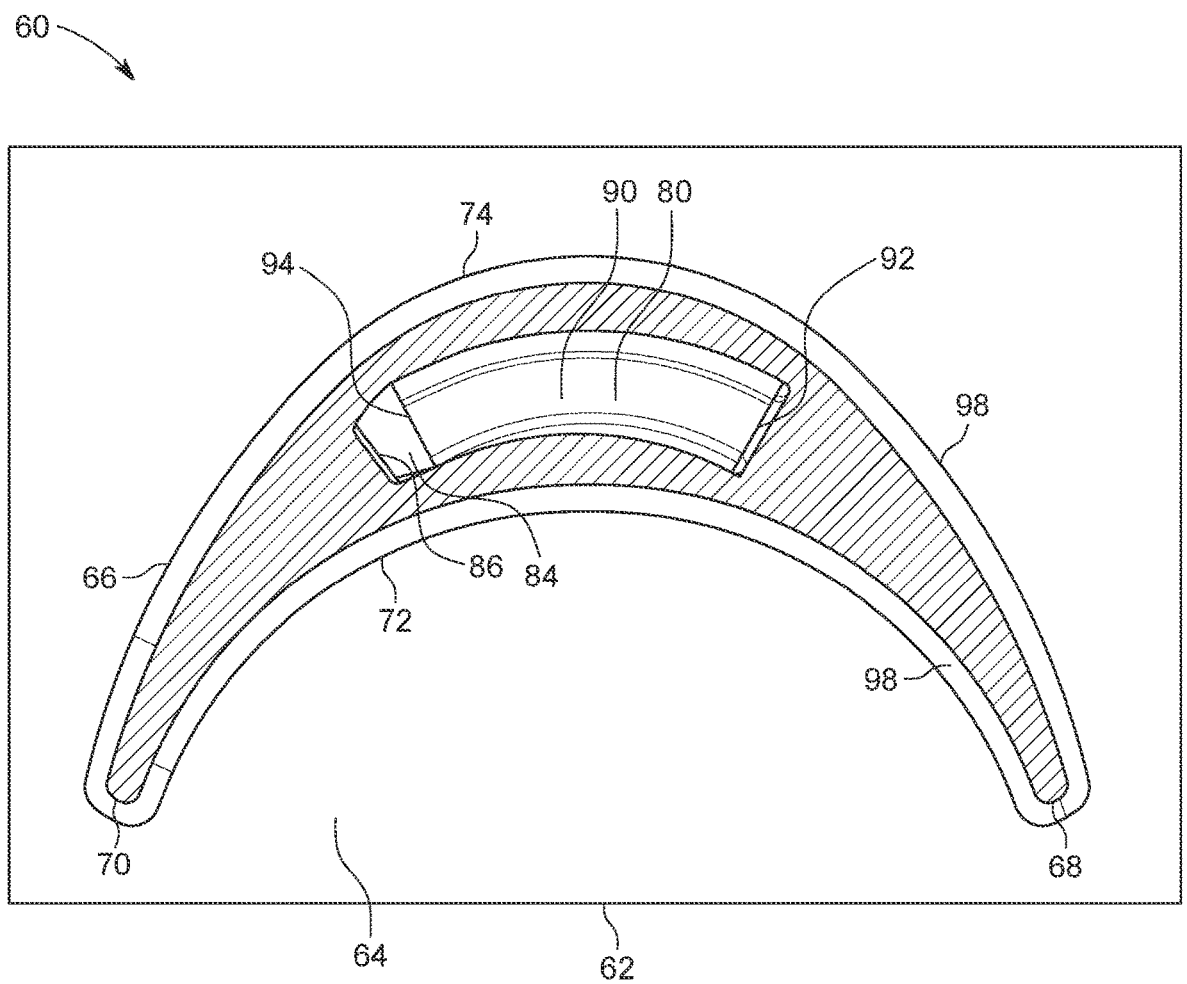
FIG. 3B is a top view of the portion of the blisk shown in FIG. 3A, the view showing the blade in cross-section so as to facilitate viewing of the integral tuned mass absorber positioned within an internal cavity.
Figure 3C:
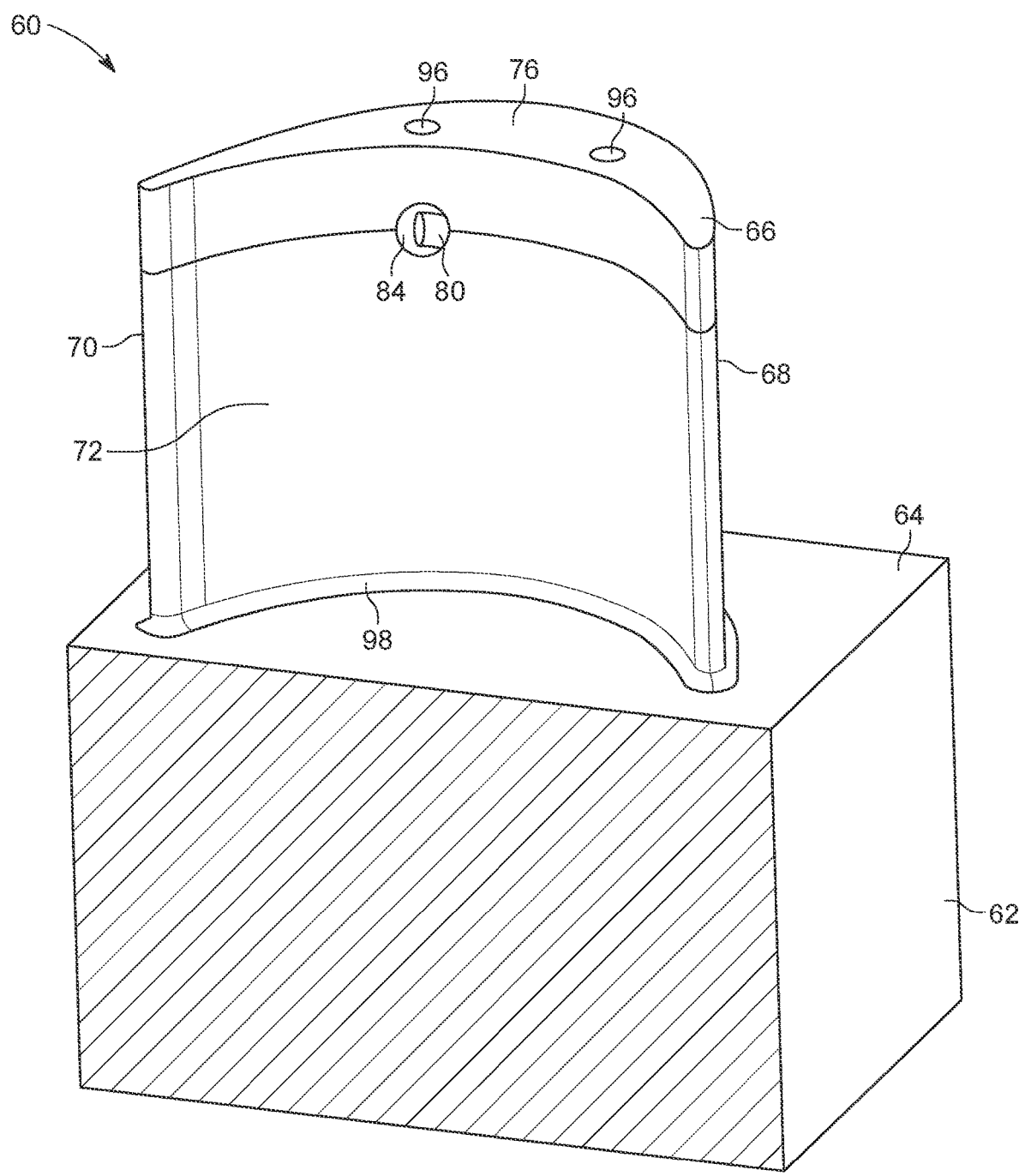
FIG. 3C is a perspective view, partially in cross-section, of the additively fabricated blisk of FIG. 3A, the view showing the complete additively fabricated blade, wherein a portion of the concave pressure side of the blade is cutaway to allow viewing of a portion of the tuned mass absorber within the internal cavity.
Figure 3D:
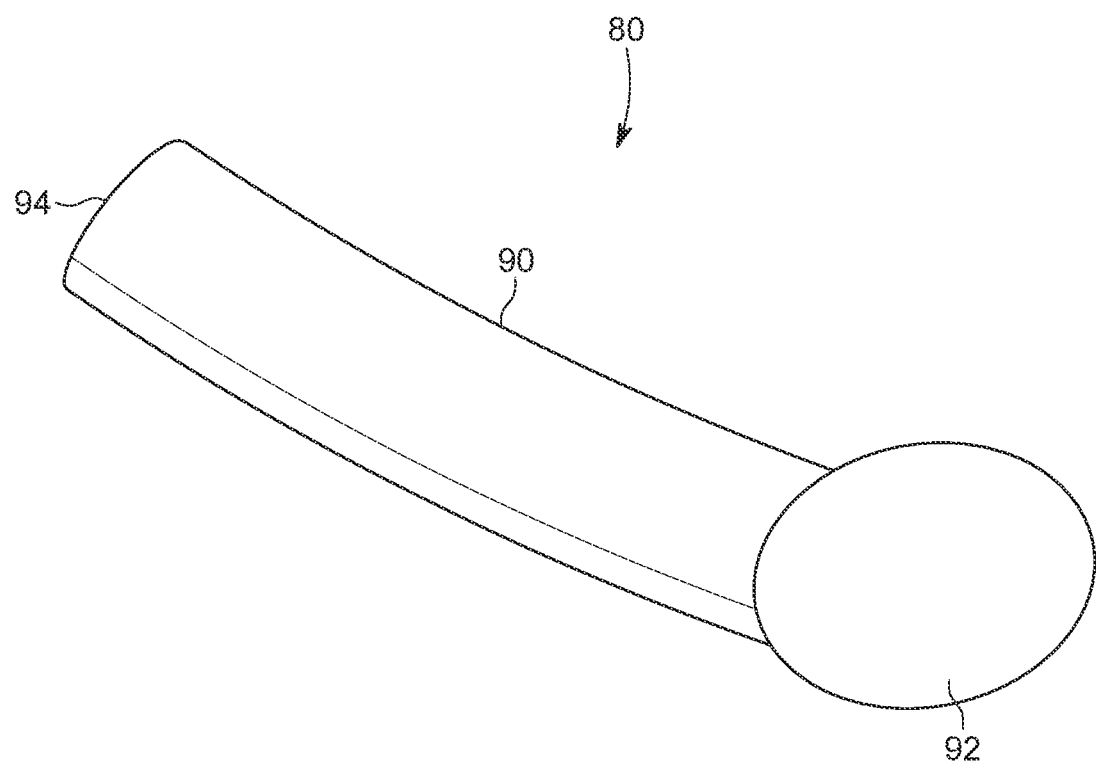
FIG. 3D is perspective view of the integral additively fabricated tuned mass absorber of FIG. 3A.
Figure 3E:
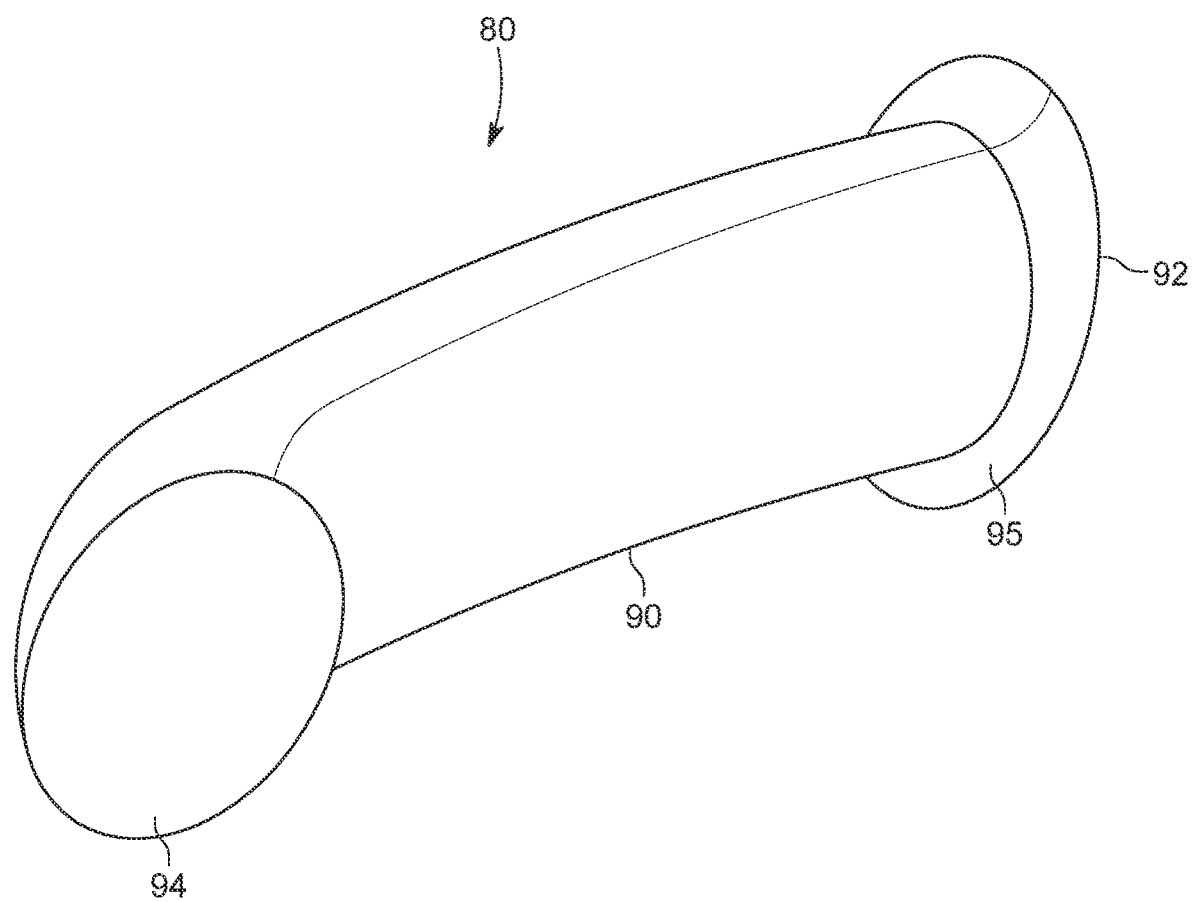
FIG. 3E is another perspective view of the integral additively fabricated tuned mass absorber shown in FIG. 3A.
Figure 3F:
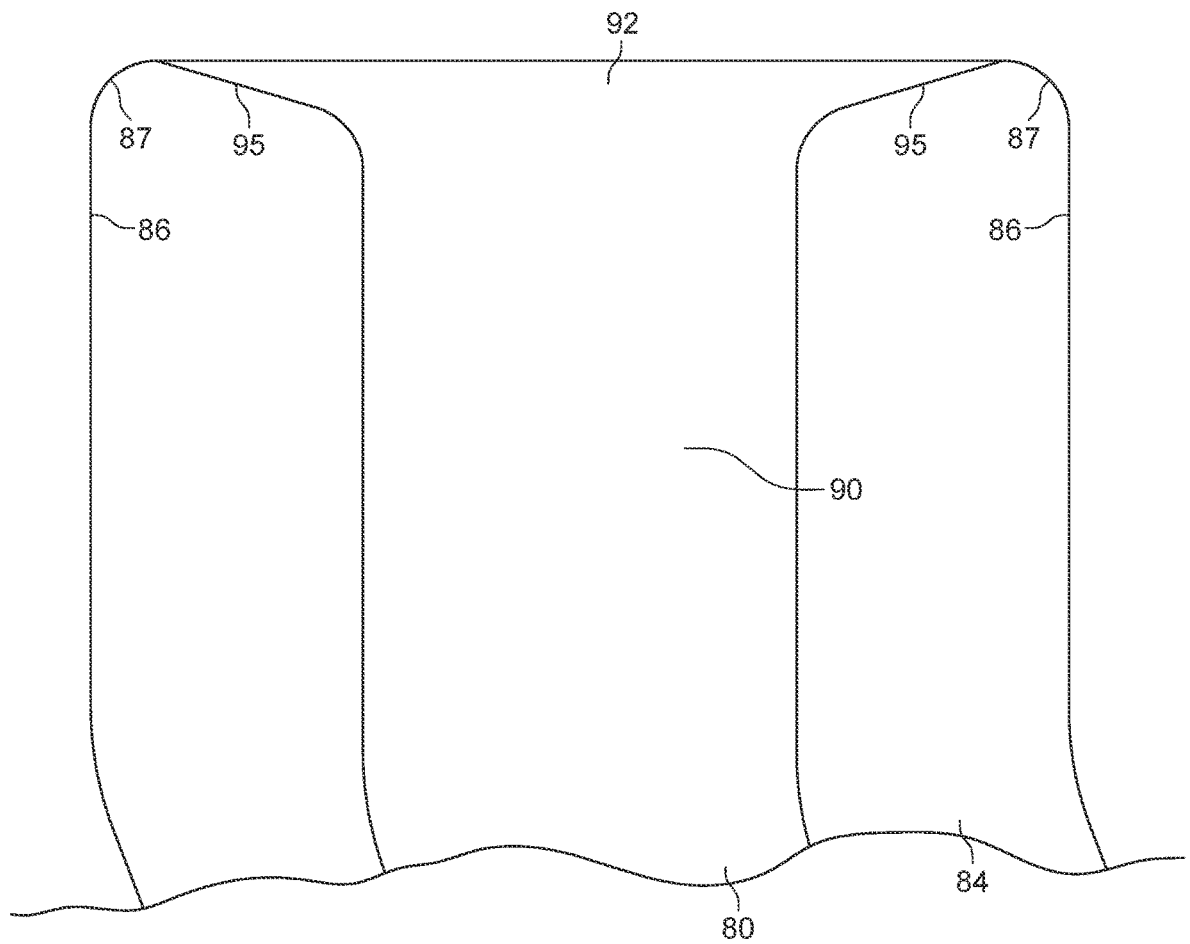
FIG. 3F is a diagram illustrating the merging of the filleted area of the tuned mass absorber with the filleted areas of the cavity inner wall.
Figure 3G:
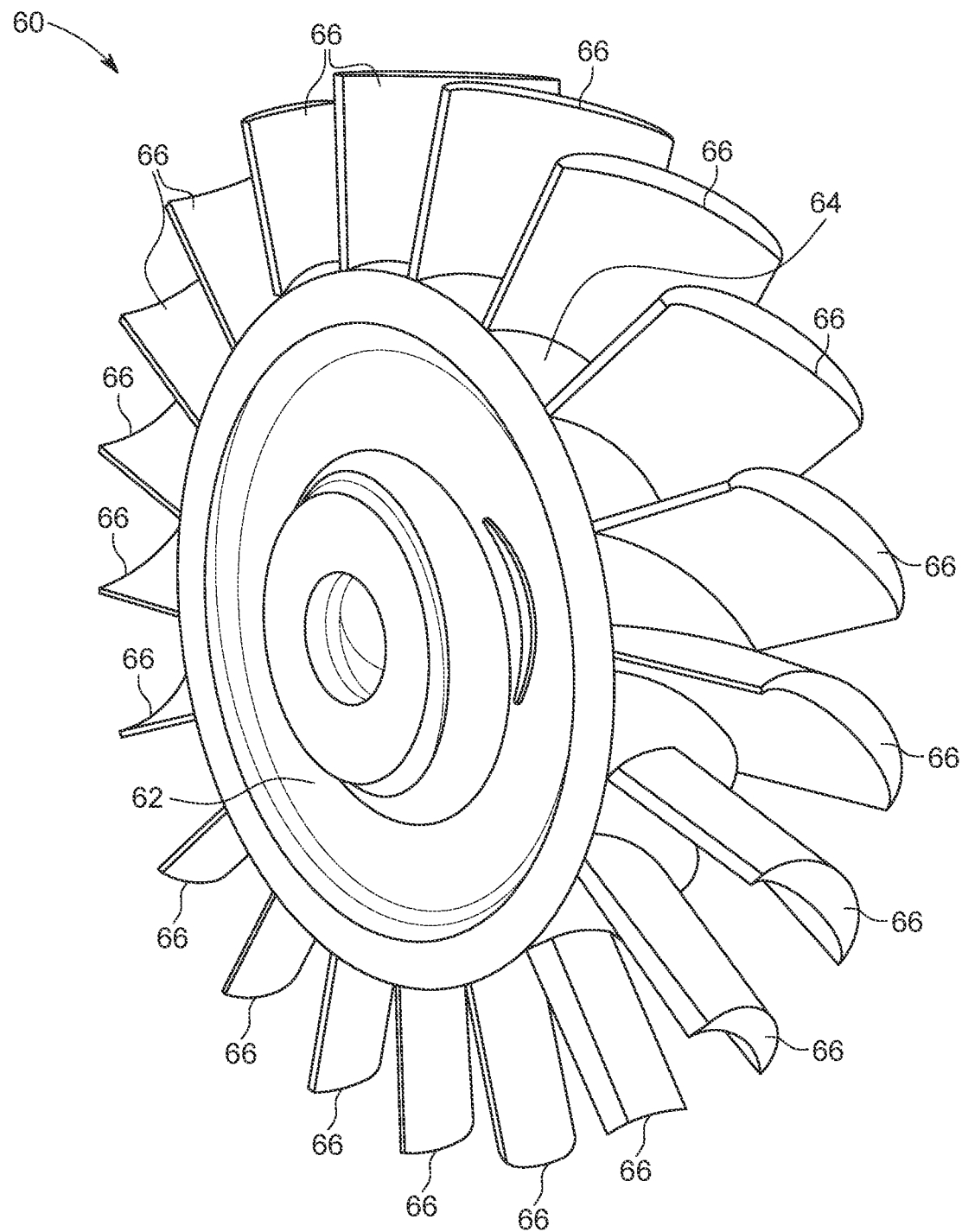
FIG. 3G is a perspective view of the entire monolithic additively fabricated blisk of FIG. 3A.

Referring to FIGS. 3A-F, there is shown a perspective view, in cross-section, of a portion of additively fabricated blisk 60 in accordance with another exemplary embodiment. Blisk 60 comprises disk portion 62 having periphery 64 and a plurality of blades 66 radially extending from periphery 64 and consecutively arranged in an annular array. FIG. 3A is a partial view of blisk 60 and thus, only one blade 66 is shown. Blade 66 includes leading edge 70 and trailing edge 68. The chord of blade 66 is defined between leading edge 70 and trailing edge 68. Concave pressure side 72 and convex suction side 74 are also defined between the leading edge 70 and trailing edge 68. Blade 66 includes tip portion 76. Blade 66 further includes integral tuned mass absorber 80 that is additively fabricated simultaneously with the additive fabrication of blade 66. Absorber 80 is oriented in the chordwise direction between leading edge 70 and trailing edge 68. Absorber 80 is located within internal cavity 84 that is created during the additive fabrication process (see FIGS. 3A, 3B and 3C). Internal cavity 84 has cavity inner wall 86 and filleted areas 87. The function of filleted areas 87 is the same as the function of filleted areas 46 of internal cavity 44 (see FIG. 2F). Referring to FIGS. 3A, 3B, 3D and 3E, absorber 80 is additively fabricated to have curved elongate portion 90, first end portion 92 and opposite second end portion 94. Opposite second end portion 94 is free and is not in physical contact with any portion of cavity inner walls 86. The curvilinear length of absorber 80 is parallel to the blade chord. Absorber 80 has an elliptical cross-section. As discussed in the foregoing description, the elliptical cross-section facilitates suppression of blade vibrations in at least two modes of vibration. In this embodiment, absorber 80 significantly reduces the vibratory response in the flexwise mode and the stiffwise/torsion mode. As discussed in the foregoing description, the elliptical cross-section provides three absorber parameters: the major axis, the minor axis and the length. These three absorber parameters initially are optimized to match the natural frequencies of any two blade modes of which the vibratory responses are to be reduced. The mass of absorber 80 is as large as possible while maintaining adequate blade radial strength of the cavity cross-section. The geometric size of the cavity will constrain the mass magnitude. The geometric shape of absorber 80 and internal cavity 84 are the results of a second optimization process which is described in the ensuing description. Referring to FIGS. 3E and 3F, first end portion 92 is configured with smooth filleted areas 95. The purpose of filleted areas 95 is the same as the purpose of filleted areas 51 of absorber 40 (see FIG. 2F). In an exemplary embodiment, smooth filleted areas 95 have the largest possible radii. First end portion 92 is completely integral with cavity inner wall 86. Filleted areas 95 of first end portion 92 are contiguous with the filleted or curved areas 87 of cavity inner wall 86 thereby eliminating any sharp angles and providing a smooth transition from cavity inner wall 86 to curved elongate portion 90 of absorber 80. Thus, cavity inner walls 86 smoothly merge with absorber 80 at the start of filleted areas 95 of first end portion 92. As a result of this configuration, filleted areas 87 and 95 significantly reduce vibratory stress concentrations on absorber 80. Free opposite second end portion 94 of absorber 80 can be seen in the cutaway view of FIG. 3C. As absorber 80 absorbs vibrations during operation of blisk 60, curved elongate portion 90 and opposite second end portion 94 never contact cavity inner wall 86. As shown in FIGS. 3A and 3B, the curvilinear length of absorber 80 is parallel to the blade chord. This orientation allows absorber 80 to be additively fabricated in the same direction as the rest of blade 66, from trailing edge 68 to leading edge 70. Referring to FIG. 3C, blade 66 includes holes or openings 96 in blade tip 76. Holes 96 are integrally fabricated into blade 66 and are used to blow out leftover metal powder from the LMS process. As shown in FIGS. 3A and 3B, blade 66 has filleted areas 98 so as to smoothly merge with periphery 64 of disk portion 62. In other embodiments, there is only one hole or opening 96 in blade tip 76.

Optimization of absorber 80 may be accomplished with the same advanced engineering simulation software used to optimize absorber 40 which was described in the foregoing description. The initial geometrical parameters of absorber 80 that are used in the optimization process include the overall curve linear length of absorber 80 and the cross-sectional major axis and the minor axis of curved elongate portion 90. The curve linear length of absorber 80 is limited by the maximum possible size of internal cavity 84. The initial geometrical parameter settings are developed by analytically isolating absorber 80 and then optimizing so that the two fundamental modes of vibration for absorber 80 equal the two problematic modes of vibration for a blade 66 modeled with an internal cavity 84 but without absorber 80. However, this is not the final optimized solution because a forcing function will favor one mode over another mode. Therefore, a common generic loading function is applied, which in the general case is a unit pressure load on concave pressure side 72 of blade 66, and the displacement of a selected single location on blade tip 76 is measured in order to determine the vibratory response. Optimization is then performed on the complete blade 66 having integral absorber 80 which results in the final geometrical parameter values. After the final geometrical parameter values are obtained, the CAD (Computer-Aided-Design) files are then generated and loaded into the computer controlled additive fabrication machine.

For purposes of understanding the additive fabrication of blades 66 with integral absorbers 80, the following description is in terms of the additive fabrication of a single blade 66. However, it is to be understood that the entire blisk 60 is fabricated in a single additive fabrication procedure. In an exemplary embodiment, a first step in additively fabricating blade 66 is to determine the final geometrical parameter values of absorber 80 using the aforesaid optimization process. Next, a CAD data file is generated which includes the determined final geometrical parameter values of absorber 80. The CAD data file is programmed or loaded into the computer or microprocessor of an additive manufacturing machine (e.g. Laser Metal Sintering machine). The additive fabrication process of blisk 60 is then initiated. The metal powder is disposed in layers from trailing edge 68 to leading edge 70. A blade support lattice is additively fabricated in order to support the blade during the additive fabrication process. Lattice support for chordwise absorber 80 is unnecessary because chordwise absorber 80 is self-supporting during the powder deposition. This will also eliminate the expensive process of removing that lattice support after completion of the additive fabrication process. After the additive fabrication process is complete, the next step is to grind off sections of the blade support lattice that are greater than forty-five (45) degrees from vertical. Hand tools may be used for this step. Next, residue metal powder contained within internal cavity 84 is blown through holes 96 in blade tip 76. Next, the exterior surface of blade 66 is then finished using standard additive manufacturing techniques such as the "Low Stress Ground" method.

Figure 4:
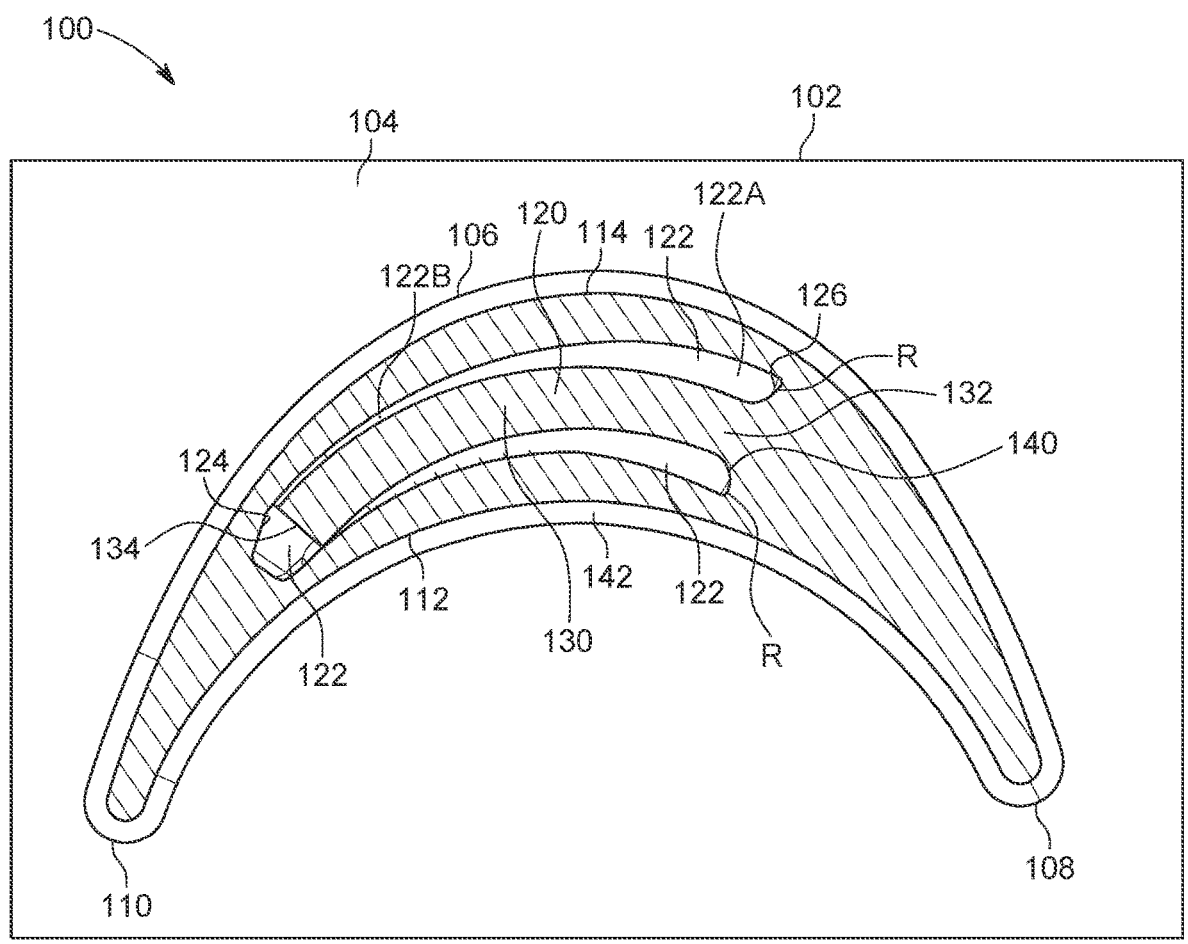
FIG. 4 is partial, cross-sectional view of a portion of an additively manufactured blisk having a blade in accordance with another exemplary embodiment.

Referring to FIG. 4, there is shown a cross-sectional view of a portion of an additively fabricated blisk 100 in accordance with another exemplary embodiment. Blisk 100 comprises disk portion 102 having periphery 104 and a plurality of blades 106 radially extending from periphery 104 and consecutively arranged in an annular array. FIG. 4 is a partial view of blisk 100 and thus, only one blade 106 is shown. Blade 106 includes leading edge 108 and trailing edge 110. The chord of blade 106 is defined between leading edge 108 and trailing edge 110. Concave pressure side 112 and convex suction side 114 are also defined between the leading edge 108 and trailing edge 110. Blade 106 includes a tip portion (not shown) but which is substantially the same as tip portion 76 of blade 66 discussed in the foregoing description. Blade 106 further includes integral tuned mass absorber 120 that is additively fabricated simultaneously with the additive fabrication of blade 106. Absorber 120 is oriented in the chordwise direction between leading edge 108 and trailing edge 110. Chordwise absorber 120 is located within internal cavity 122 that is created during the additive fabrication process. Internal cavity 122 has cavity inner wall 124 and filleted areas 126. The function of filleted areas 126 is the same as the function of filleted areas 87 (see FIG. 3F). Absorber 120 has an elliptical cross-section. The significance of the elliptical cross-section is discussed in the foregoing description with respect to absorbers 40 and 80. Absorber 120 is additively fabricated and has substantially the same shape and configuration as absorber 80 shown in FIG. 3B. Absorber 120 has elongate portion 130, first end portion 132 and opposite second end portion 134. Opposite second end portion 134 is free and is initially not in physical contact with any portion of cavity inner walls 124. In this embodiment, internal cavity 122 narrows as it extends from first end portion 132 to opposite second end portion 134. Thus, internal cavity 122 is relatively wider near first end portion 132 than it is at opposite second end portion 134. The wider portion of internal cavity 122 is referred to by reference number 122A. Wider portion 122A provides for a large radius "R" (see FIG. 4) on absorber 120. Internal cavity 122 is narrow at opposite second end portion 134 of absorber 120. The narrow portion of internal cavity 122 is indicated by reference number 122B. Narrow portion 122B limits excessive vibratory response of absorber 120. Wider portion 122A and narrow portion 122B cooperate to reduce the stresses in absorber 120. Absorber 120 has a curvilinear length that is parallel to the blade chord. Absorber 120 has an elliptical cross-section which, as discussed in the foregoing description, facilitates suppression of blade vibrations in at least two modes of vibration. Absorber 120 significantly reduces the vibratory response in the flexwise mode and the stiffwise/torsion mode. First end portion 132 is configured with filleted areas 140. The purpose of filleted areas 140 is the same as the purpose of filleted areas 95 of absorber 80 (see FIG. 3F). First end portion 132 is completely integral with cavity inner wall 124. Filleted areas 140 of first end portion 132 are contiguous with the filleted or curved areas 126 of cavity inner wall 124 thereby eliminating any sharp angles and providing a smooth transition from cavity inner wall 124 to elongate section 130 of absorber 120. Thus, cavity inner walls 124 smoothly merge with absorber 120 at the start of filleted areas 140 of first end portion 132. As a result of this configuration, filleted areas 126 and 140 significantly reduce vibratory stress concentrations on absorber 120. If extremely high vibrations occur during operation of blisk 100, opposite second end portion 134 may contact portions of cavity inner wall 124 in order to reduce the vibratory stress of absorber 120. Blade 106 has filleted areas 142 that smoothly merge with periphery 104 of disk portion 102. The optimization and additive manufacturing processes used for blade 66 (discussed in the foregoing description) may also be used for blade 106. During the additive manufacturing process, a lattice support for absorber 120 is unnecessary because absorber 120 is self-supporting during the powder deposition. This will also eliminate the expensive process of removing that lattice support after completion of the additive fabrication process.

The blades having integral tuned mass absorbers as described herein allow for highly accurate characterization of the structural dynamic response. These structural dynamic characteristics are tractable and allow for pre-fabrication prediction of the operational response to determine if high-cycle fatigue requirements will be met. Therefore, expensive post-fabrication iteration of the final blade design is no longer required thereby significantly reducing manufacturing time and costs.

In other exemplary embodiments, the additively fabricated blade has a plurality of integral tuned mass absorbers in order to reduce vibratory resonance response in more than two modes of interest. In one such embodiment, the additively fabricated blade has three integral tuned mass absorbers arranged in parallel to the chord of blade so as to reduce the resonance response in up to six different modes of interest.

Other flow-path components within a turbomachine system may be additively manufactured with integral tuned mass absorbers in accordance with the concepts and techniques disclosed herein. Such other flow-path components include turbine stators, vanes, industrial fan blades, pump-side inducer blades and impeller blades.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A monolithic blisk, comprising:
a disk portion having a periphery; and
a plurality of blades radially extending from the periphery and consecutively arranged in an annular array, each blade having a blade tip, a leading edge, a trailing edge, a pressure side and a suction side, each blade being configured to have an internal cavity having a cavity inner wall, wherein the internal cavity is located between the pressure side and suction side, each blade being further configured to have a tuned mass absorber located within the internal cavity, the tuned mass absorber comprising an elongate portion having a first end portion completely integral with the cavity inner wall and a free opposite second end portion, wherein the elongate portion and the free opposite second end portion do not contact the cavity inner wall as the tuned mass absorber absorbs vibrations during operation of the blisk.

2. The monolithic blisk according to claim 1 wherein the internal cavity and the tuned mass absorber extend in a spanwise direction.

3. The monolithic blisk according to claim 1 wherein the tuned mass absorber is oriented such that the free opposite second end portion is located radially inboard of the first end portion.

4. The monolithic blisk according to claim 1 wherein the internal cavity and the tuned mass absorber extend chordwise between the leading edge and the trailing edge.

5. The monolithic blisk according to claim 4 wherein the internal cavity and the tuned mass absorber are configured with a curvature that corresponds to a chord of the blade.

6. The monolithic blisk according to claim 1 wherein the cavity inner wall has smooth filleted areas.

7. The monolithic blisk according to claim 6 wherein the first end portion of the tuned mass absorber is configured with a smooth filleted area that merges with the smooth filleted areas of the cavity inner wall so as to reduce vibratory stress concentration on the tuned mass absorber.

8. The monolithic blisk according to claim 1 wherein the blade tip has at least one hole for blowing out residue metal powder.

9. The monolithic blisk according to claim 1 wherein the tuned mass absorber has an elliptical cross-section that facilitates suppression of blade vibrations in at least two modes of vibration.

10. A monolithic blisk, comprising:
a disk portion having a periphery; and
a plurality of blades radially extending from the periphery and consecutively arranged in an annular array, each blade having a blade tip, a leading edge, a trailing edge, a pressure side and a suction side, each blade being configured to have an internal cavity having a cavity inner wall, wherein the internal cavity is located between the pressure side and suction side, each blade being further configured to have a tuned mass absorber located within the internal cavity, the tuned mass absorber comprising an elongate portion having a longitudinally extending axis, a first end portion completely integral with the cavity inner wall and a free opposite second end portion, wherein the internal cavity and the tuned mass absorber extend in a spanwise direction and wherein the free opposite second end portion of the tuned mass absorber is located radially inboard of the first end portion of the tuned mass absorber, wherein the elongate portion and the free opposite second end portion do not contact the cavity inner wall as the tuned mass absorber absorbs vibrations during operation of the blisk.

11. The monolithic blisk according to claim 10 wherein the cavity inner wall has smooth filleted areas and wherein the first end portion of the tuned mass absorber is configured with a smooth filleted area that merges with the smooth filleted areas of the cavity inner wall so as to reduce vibratory stress concentration on the tuned mass absorber.

12. The monolithic blisk according to claim 10 wherein the tuned mass absorber has an elliptical cross-section that facilitates suppression of blade vibrations in at least two modes of vibration.

13. A turbine blade, comprising a blade tip, a leading edge, a trailing edge, a pressure side and a suction side, the turbine blade being configured with an internal cavity having a cavity inner wall, wherein the internal cavity is located between the pressure side and suction side, the blade being further configured to have a tuned mass absorber located within the internal cavity, the tuned mass absorber comprising an elongate portion having a first end portion completely integral with the cavity inner wall and a free opposite second end portion, wherein the elongate portion and the free opposite second end portion do not contact the cavity inner wall as the tuned mass absorber absorbs vibrations during operation of the turbine blade.

14. The turbine blade according to claim 13 wherein the internal cavity and the tuned mass absorber extend in a spanwise direction.

15. The turbine blade according to claim 14 wherein the tuned mass absorber is oriented such that the free opposite second end is located radially inboard of the first end portion.

16. The turbine blade according to claim 13 wherein the internal cavity and the tuned mass absorber extend chordwise between the leading edge and the trailing edge.

17. The turbine blade according to claim 16 wherein the internal cavity and tuned mass absorber are both configured with a curvature that corresponds to a chord of the blade.

18. The turbine blade according to claim 13 wherein the cavity inner wall has smooth filleted areas and wherein the first end portion of the tuned mass absorber is configured with a smooth filleted area that merges with the smooth filleted areas of the cavity inner wall so as to reduce vibratory stress concentration on the tuned mass absorber.

19. The turbine blade according to claim 13 wherein the blade tip has at least one hole for blowing out residue metal powder.

20. The turbine blade according to claim 13 wherein the internal cavity and the tuned mass absorber extend chordwise between the leading edge and the trailing edge and wherein the internal cavity and the tuned mass absorber are both configured with a curvature that corresponds to a chord of the blade, the internal cavity being configured to narrow as the internal cavity extends from the first end portion of the tune mass absorber to the free opposite second end portion of the tuned mass absorber so as to limit the vibratory response of the tuned mass absorber.

21. The turbine blade according to claim 13 wherein the tuned mass absorber has an elliptical cross-section that facilitates suppression of blade vibrations in at least two modes of vibration.

* * * * *